Oct. 14, 1969   M. B. PEARCE, JR   3,472,301
SELF-SEALING MECHANICAL FASTENER
Filed Oct. 18, 1967
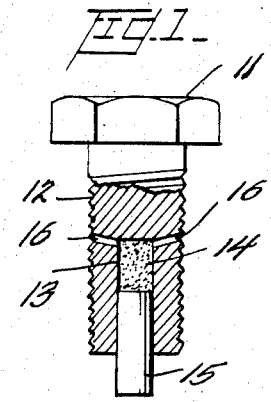
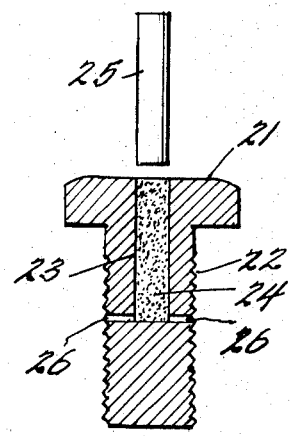
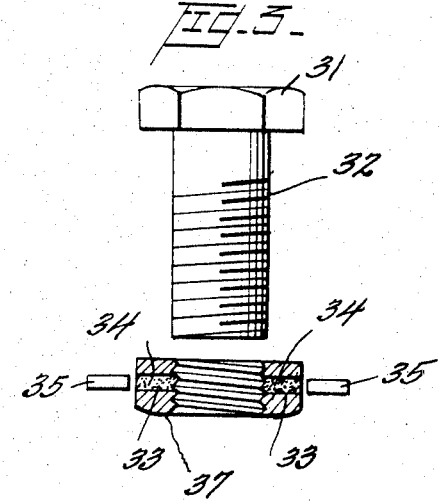
MALCOLM B. PEARCE, JR. INVENTOR
BY J. Rodney Reck
ATTORNEY such as flexible
United States Patent Office 3,472,301
Patented Oct. 14, 1969

3,472,301
SELF-SEALING MECHANICAL FASTENER
Malcolm B. Pearce, Jr., Durham, Conn., assignor to Loctite Corporation, Newington, Conn., a corporation of Connecticut
Filed Oct. 18, 1967, Ser. No. 676,335
Int. Cl. F16b 39/02, 39/34, 13/10
U.S. Cl. 151—14.5                                 4 Claims

ABSTRACT OF THE DISCLOSURE

Self-sealing mechanical fasteners including an end portion for bearing against surfaces to be joined and a shank portion for penetrating the surfaces, at least one of such portions having a cavity containing liquid sealant. A means is provided for forcing the sealant into the interior of the fastened assembly after the fastener has been partially or fully tightened. A typical example is a nut and bolt wherein the bolt has a concentric cavity filled with liquid sealant, a capillary or channel from the interior end of the cavity to the outside surface of the bolt, and a dowel snuggly fitting the cavity which can be inserted to force the liquid sealant through the capillary.

BACKGROUND OF THE INVENTION

This invention deals with mechanical fastening devices, such as screws, nuts and bolts, rivets, studs and the like. Frequently these fasteners are used in applications where sealing of the fastened assembly is essential, such as on pressure or vacuum vessels or to provide absolute seals against seepage or leaking.

In the past, the most common means for maintaining a seal around a mechanical fastener of the type in question have been auxiliary sealing devices, such as flexible washers and liquid or paste sealants applied to the fastener assembly at the time of use. Needless to say, such measures are time consuming and often cumbersome for a variety of reasons. Further, washers often tend to lose their sealing ability with age, or because of reaction with materials to which they are exposed in the atmosphere or otherwise.

Recently, some success has been obtained by the use of micro-encapsulated sealing materials deposited on the threads of threaded fasteners or on the shank of non-threaded fasteners or, in the case of two component sealants (e.g., epoxy resins), on separate but adjacent portions of the fastener. See, for example, United States Patents 3,061,455 to Anthony, issued Oct. 30, 1962, and 3,179,143 to Schultz et al., issued Apr. 20, 1965. When the fastener is used in the appropriate manner, the capsules are ruptured or the components mixed and the sealant coats and seals the contact area. Since the sealant is released (or compounded) in situ within the fastener contact area, it achieves an internal seal which is more effective and more durable than the essentially external seal given by a washer or externally applied liquid sealant. When this sealant also serves an adhesive function, an auxiliary benefit is obtained due to the increase in the holding power of the fastener. Naturally, the adhesive material must be capable of hardening in place to be capable of serving this adhesive function.

Unfortunately, certain practical problems are encountered in the application of micro-encapsulated sealants to mechanical fasteners in the manner described above. Of necessity, the capsules are subject to abuse because of their location on an exposed portion of the fastener, resulting in loss of capsules from the fastener surface or rupture of large numbers of capsules prior to use. The result is that fasteners frequently contain insufficient amounts of sealant to perform the desired function, or even worse, are unusable due to hardening of the sealant which has escaped from the capsules and perhaps even bonded a number of the fasteners together. Similar problems are experienced in dealing with other types of sealants which are applied to the sealing surfaces, such as the two-component sealants discussed above.

A more fundamental difficulty is inherent in the disposition of the sealant, regardless of form, on the sealing surfaces of the fastener. Many fasteners have a close fit with the part being fastened or with a cooperating engaging element (e.g., a nut) and the presence of a layer of capsules can readily interfere with the introduction of the fastener into the opening of the part or element. Moreover, the sealant regardless of form, generally interferes with the tightening of the fastener which necessitates the application of disproportionately large tightening forces to complete the fastening operation. This problem is particularly acute when the sealant also serves an adhesive function since nearly all appropriate adhesive materials are quite viscous and significantly impede the tightening of the fastener.

A self-sealing fastener which avoided these problems of the prior art would be an extremely novel and useful item.

THE INVENTION

The subject of this invention is a mechanical fastener which provides the benefits of internal sealing without objectional interference by the sealant during the entire fastening operation. More specifically, the invention concerns a mechanical fastener having at least one end portion for bearing against one of a plurality of surfaces to be joined, a shank portion for penetrating said surfaces, the fastener having at least one cavity containing flowable or liquid sealant, and means for forcing the sealant into the joint between the fastener and the surfaces after commencing of the fastening operation. Preferably the cavity connected or openable to the outside surface of the fastener, such as by means of small channels or capillaries, so that once the fastener is seated in place, the liquid sealant can be forced from the cavity to the surfaces of the fastener where it can serve its sealing function. Further, it is preferable for the means for forcing the sealant into the joint to be a dowel (or plunger or piston) which is adapted to snugly fit the cavity and which, upon movement into the cavity, expresses the sealant for use as described herein. Likewise, it is preferred for the liquid sealant to be contained within microcapsules or other pressure-rupturable shell to insure retention of the sealant within the cavity prior to the time of intended use.

During use the fastener is at least partially tightened prior to forcing of the sealant onto the fastener surfaces. Preferably the fastening operation is completed or substantially completed prior to the forcing of the liquid sealant from the cavity since this prevents interference by the sealant with the fastening operation. The net result of use of one of the fasteners of this invention is the forcing of the sealant into the joint after the fastening operation has been partially or entirely completed, thus providing the benefits of internal sealing without the problems presented by the placing of a liquid sealant on the fastener surfaces prior to commencing of the fastening operation.

BRIEF DESCRIPTION OF THE DRAWINGS

FIG. 1 is a view in side elevation of a typical bolt having a cavity at its lower (threaded) end filled with a flowable sealant, and a dowel or plunger associated therewith for expressing the sealant from the cavity.

FIG. 2 is a similar view of a bolt having a cavity at its upper (head) end filled with flowable or liquid sealant, the cavity being equipped with a dowel for expressing the liquid sealant from the cavity.

FIG. 3 is a like view of a bolt in combination with a nut wherein the liquid sealant is contained within a plurality of cavities in the nut, the cavities being equipped with dowels or pistons for expressing the liquid therefrom.

DESCRIPTION OF THE INVENTION AND ITS PREFERRED EMBODIMENTS

Referring more particularly to the drawings, the bolt shown in FIG. 1 includes a threaded shank portion 12 and, as an end portion 11, a standard hexagonal head. At the end of threaded shank portion 12 opposite the end portion 11 is a cylindrical cavity 13 filled with liquid sealant 14. Connecting the cavity 13 with the outside threaded surface of the shank portion 12 are a plurality of capillaries or channels 16. Dowel or plunger 15 fits tightly into cavity 13 and, upon being forced into the cavity, expresses the flowable sealant 14 from the cavity through the capillaries onto the outer surface of the fastener. In use, the bolt of FIG. 1 can be used with a conventional hexagonal threaded nut in the customary fashion. After completion of the fastening operation, the dowel can be driven into the cavity which forces the sealant through the capillaries or channels onto the interior portion of the threaded assembly. When the bolt is used without a nut, e.g., when used as a stud and driven into a blind hole, the dowel will make contact with the bottom of the threaded hole near the end of the fastening operation, be forced into the cavity, and force liquid into the threaded surfaces of the stud and threaded hole. With a low viscosity sealant in the cavity, the channels can be omitted; under the pressure of the advancing dowel, the sealant will be forced between the dowel and sides of the cavity and into the fastener area. In either case, the fastening operation is substantially or fully completed prior to expression of the liquid sealant onto the threaded fastener area, thereby substantially eliminating any hindrance caused by the sealant with the fastening operation.

FIG. 2 illustrates a bolt having a threaded shank portion 22 and an end portion 21 formed as a standard hexagonal head. Concentrically penetrating end portion 21 and extending into shank portion 22 is cavity 23 filled with flowable sealant 24. At the extremity of cavity 23 furtherest from end portion 21 are capillaries or channels 26 connecting the cavity with the outside surface of threaded shank portion 22. Dowel or plunger 25 can be inserted into cavity 23 to force the liquid sealant through channels 26 onto threaded shank portion 22 subsequent to commencing or completing the fastening operation.

FIG. 3 illustrates a nut and bolt combination, the bolt having a standard hexagonal head portion 31 and a standard threaded shank portion 32. End portion 37 (a standard hexagonal nut) contains a plurality of cavities 33 substantially perpendicular to the axis of the nut. Cavities 33 contain liquid sealant 34 and have dowels 35 associated therewith which can be used to express the liquid sealant from the cavities subsequent to commencing or completing of the fastening operation and thus internally seal the fastened assembly.

The invention disclosed herein can be used on a wide range of mechanical fasteners, specifically any fastener which passes through or into the items to be fastened. Therefore, the specific configurations of fasteners as shown in the drawings is not a limitation upon the broad concept of the invention disclosed herein. Examples of suitable fasteners are studs, nuts and bolts, screws, nails, and rivets, among others. Particular benefits are imparted to threaded fasteners by the use of the invention disclosed herein because threaded fasteners contain relatively large clearances between the surfaces of the fastener and the surfaces of the items fastened. The liquid sealant more easily and more efficiently can be expressed into these clearances than with most other types of fasteners. Therefore, threaded fasteners form a preferred embodiment of this invention.

Likewise, the exact configuration of the fastener and the cavity therein is not a limitation upon this invention. While cylindrically shaped cavities are the most conveniently formed (as by drilling) and comprise a preferred embodiment of this invention, the geometry of the cavity is not critical and can be adapted to the specific fastener involved. For example, the cavity could be square or triangular shaped, spherical, pyramidal, coneshaped and so forth. Further, the location of the cavity on the fastener is not critical. The cavity can be located interiorly or exteriorly of the fastener, and can be located on any convenient portion of the fastener. The only requirement is that the cavity must have an opening or other access to the interior portion of the fastened assembly at some point in time subsequent to commencing of the fastening operation to permit expression of the sealant into the assembly.

The means for forcing of the liquid sealant from the cavity to the interior of the fastener can be by any method capable of accomplishing the objective as disclosed herein. The means can be a physical device, such as the dowels or plungers shown in the accompanying figures. In the case of a high viscosity liquid sealant, the sealant can be placed in a cavity immediately adjacent to the fastener surface and the means for removal can be heat which serves to convert the high viscosity liquid sealant to a more easily flowable one capable of spreading to the appropriate surfaces. Or, as another example, a segment or section of the fastener shank can be flared or fluted and liquid sealant placed in the flared or flutted portion of the fastener. In this manner the means of expressing the sealant is merely completing the fastening operation since the tightening of the threaded fastener into the appropriate mating member will straighten the flared portion or close the fluted portion and express the sealant onto the appropriate surfaces.

The liquid sealant used in the fasteners of this invention can be any composition capable of providing a sealing or adhesive function necessary in the particular use for which the mechanical fastener is intended. Frequently, any liquid sealant capable of remaining in the fastener assembly under low or moderate pressure will suffice. Preferably, however, the liquid sealant is one which will harden after being forced into the fastener assembly since this generally produces a significant increase in sealing and bonding ability. For example, a two part encapsulated epoxy resin can be used if the components are separately encapsulated, the capsules mixed and then placed in the cavity or cavities of the fasteners described herein. The two components automatically will be mixed during use of the fastener and the epoxy resin will harden in the conventional fashion.

The most highly preferred liquid sealant is an anaerobically curing sealant which remains liquid in the presence of oxygen but which hardens in the absence of oxygen (such as when forced into a fastener assembly as described herein). Typical examples of sealants of this type are acrylate esters which, in the presence of peroxy initiators, remain liquid when exposed to oxygen but which polymerize in the absence of oxygen to form hard, durable resins. Of particular utility are polymerizable di- and other polyacrylate ester monomers, such as the polyalkylene glycol dimethacrylates.

The catalyst to be used with the above acrylate or polyacrylate esters can be classed as "peroxy initiators." Preferred examples of these initiators are the organic hydroperoxides, such as cumene hydroperoxide. However, other peroxy initiators can be used such as hydrogen peroxide, organic peroxides, or materials such as peresters which hydrolyze to form peroxides. The peroxy initiators preferably are used in conjunction with one or more additives which provide stability during storage and/or acceleration during cure in the absence of air. For a complete description of these anaerobic sealant systems, and particularly for a complete description of suitable acrylate and polyacrylate esters, peroxy initiators and various additives for use in combination therewith, reference is made to the following United States Patents issued to Vernon K. Krieble: 2,895,950, July 21, 1959; 3,041,322, June 26, 1962; 3,043,820, July 10, 1962; 3,046,262, July 24, 1962; 3,203,941, Aug. 31 1965; and 3,218,305, Nov. 16, 1965. Sealants of this type are especially desirable because they can be formulated with nearly any viscosity desired, thereby insuring easy penetration of and retention in the fastener assembly. A preferred viscosity range is from about 10 to about 1,000 centipoises.

If the sealant is of the easily flowable type, such as the preferred viscosity range sealants described above, it may be necessary to place the sealant within a pressure-rupturable shell to insure its retention within the cavity. This generally can be accomplished conveniently by one of two methods. The first is by the use of micro-encapsulation techniques, i.e., encapsulation of liquids in small frangible capsules, typically of the size range from about 100 to 1,500 microns in diameter. A number of suitable processes are available for encapsulating liquids, such as the liquid sealants disclosed herein. See for example United States Patents 2,800,457 to Green et al., issued July 23, 1957, and 3,111,708 to Watt, issued Nov. 22, 1963. The capsules of sealant conveniently can be placed in the cavity described above and used in combination with any means for expressing the liquid from the capsules after the fastening operation has been commenced or completed, including those described above, all of which are suitable for rupturing frangible capsules of sealant and expressing the liquid sealant to perform its intended function.

The second convenient means for securing the liquid sealant within the cavities in the fastener is by covering the extremities of the cavity with a pressure-rupturable shell, such as a thin layer of any of a number of easily rupturable materials, such as common waxes, cellulose derivatives, natural gums, gelatin or the like. In a preferred aspect, when the polymerizable liquid is used as a liquid sealant, the liquid can be "skinned over" by contact with a substance capable of promoting polymerization in a liquid monomer. For example, the acrylate or polyacrylate ester compositions disclosed above can be exposed to gases such as sulfur dioxide which will promote formation of a polymer skin over the remainder of the liquid. This skin is capable of containing the liquid within the cavity until the fastener is used as described above. Other pressure-rupturable shells and other means of retaining of sealants within the cavities will be readily apparent to the skilled workers in the art and are encompassed within the broad scope of the invention disclosed herein.

When the preferred anaerobic liquid sealants are used, the openings to the cavity must be large enough and any pressure-rupturable shell if used must be permeable enough to permit atmospheric oxygen to reach the liquid and prevent the anaerobic sealant from hardening. Present experience indicates, however, that these objectives may be accomplished with relative ease.

It is to be understood that the embodiments of the present invention as shown and described herein are to be regarded as illustrative only and that the invention is susceptible to variations, modifications and changes.

What is claimed is:

1. A mechanical fastener having at least one end portion for bearing against at least one of a plurality of surfaces to be joined, a shank portion for penetrating said surfaces, at least one cavity containing microcapsules of a single phase sealant having a viscosity between about 10 and about 1000 centipoises, and means for forcing said sealant into the engaged area of the fastener subsequent to commencing of the fastening operation, said microcapsules having an average size of from about 100 microns to about 1500 microns and said sealant comprising a polymerizable acrylate ester monomer and a hydroperoxide initiator.

2. The fastener of claim 1 wherein the fastener has a threaded shank portion, the cavity is openable to the shank portion of the fastener, and the means for forcing the sealant into the assembly is a plunger adapted to tightly fit the cavity.

3. The fastener of claim 1 wherein the cavity is at the end of the shank portion opposite the end portion.

4. The fastener of claim 1 wherein the fastener is a bolt and mating nut, the cavity traverses the nut substantially perpendicular to the axis of the nut, and the means for forcing the liquid into the assembly is a plunger adapted to tightly fit the cavity.

References Cited

UNITED STATES PATENTS

| | | | |
|---|---|---|---|
| 837,767 | 12/1906 | Aims. | |
| 2,092,341 | 9/1937 | De Vries | 85—66 |
| 2,287,395 | 6/1942 | Reynolds | 85—66 |
| 2,492,605 | 12/1949 | Varney et al. | 85—65 |
| 2,559,806 | 7/1951 | Thompson | 151—14.5 |
| 2,895,950 | 7/1959 | Krieble | 260—89.5 |
| 2,942,640 | 6/1960 | Lundeberg | 151—14.5 |
| 3,041,322 | 6/1962 | Krieble | 260—89.5 |
| 3,048,433 | 8/1962 | Doetsch | 151—7 |
| 3,140,967 | 7/1964 | Kaufmann et al. | 151—14.5 |
| 3,312,929 | 4/1967 | Shannon | 151—41.7 |

FOREIGN PATENTS

| | | |
|---|---|---|
| 735,759 | 9/1932 | France. |
| 941,091 | 6/1948 | France. |
| 1,027,939 | 4/1958 | Germany. |
| 1,077,921 | 3/1960 | Germany. |
| 990,402 | 4/1965 | Great Britain. |

OTHER REFERENCES

IBM Technical Disclosure Bulletin—Self-Locking Screw, G. W. Williamson, in vol. 4, No. 9, February 1962.

MARION PARSONS, JR., Primary Examiner

U.S. Cl. X.R.

85—1, 66